United States Patent
Gao et al.

(10) Patent No.: US 10,212,283 B1
(45) Date of Patent: Feb. 19, 2019

(54) LIVE CALL DEBUGGING AND MONITORING TOOL FOR AN INTERACTIVE VOICE RESPONSE UNIT

(71) Applicant: Noble Systems Corporation, Atlanta, GA (US)

(72) Inventors: Shang Gao, Atlanta, GA (US); Denney A. Burkholder, Atlanta, GA (US); Karl H. Koster, Sandy Springs, GA (US)

(73) Assignee: NOBLE SYSTEMS CORPORATION, Atlanta, GA (US)

( * ) Notice: Subject to any disclaimer, the term of this patent is extended or adjusted under 35 U.S.C. 154(b) by 314 days.

(21) Appl. No.: 14/878,132

(22) Filed: Oct. 8, 2015

(51) Int. Cl.
| | |
|---|---|
| *H04M 3/22* | (2006.01) |
| *H04M 3/51* | (2006.01) |

(Continued)

(52) U.S. Cl.
CPC ....... *H04M 3/5166* (2013.01); *H04M 3/2281* (2013.01); *H04M 3/5175* (2013.01); *H04M 3/5183* (2013.01)

(58) Field of Classification Search
CPC ........... H04M 3/5175; H04M 3/42221; H04M 3/5183; H04M 3/5191; H04M 2203/551; H04M 3/5166; H04M 2203/408; H04M 3/5232; H04M 3/5233; H04M 3/5235; H04M 2201/40; H04M 3/42161; H04M 7/0012; H04M 3/493; H04M 2201/42; H04M 3/51; G06F 3/04842; G06F 3/04817; G06F 3/0481; G06F 3/0482; G06F 9/4443; G06F 17/30126; G06F 11/3688; G06F 17/30327; G06F 8/38; G06F 3/04847; G06F 17/30873; G06F 2203/04803;

(Continued)

(56) References Cited

U.S. PATENT DOCUMENTS

| | | | | |
|---|---|---|---|---|
| 7,515,695 | B1 * | 4/2009 | Chan ..................... | H04M 3/493 379/221.09 |
| 2003/0143981 | A1 * | 7/2003 | Kortum ................. | H04M 3/493 455/414.1 |

(Continued)

OTHER PUBLICATIONS

Maestro Version 8.0 User Manual, vol. 3, IVR; 344 pages, revised Jul. 8, 2015, Noble Systems Corporation, Atlanta GA.

(Continued)

*Primary Examiner* — Ahmad F. Matar
*Assistant Examiner* — Kharye Pope

(57) ABSTRACT

A call monitoring and debugging tool is disclosed that allows a developer to test an interactive voice response ("IVR") application comprising a plurality of menu modules. The developer can initiate a call to the IVR and is presented on a computer display a set of variable identifies and corresponding values used by the IVR application in real time. The developer can view a graphical representation of a subset of the plurality of menu modules and view a representation of the navigation of the caller through the IVR application. The developer can also view a current set of variable identifiers used by the IVR and their corresponding values in real time. Finally, the developer can invoke one of several navigation control functions to force navigation of the call in the IVR application, including forcing the call to a previously encountered menu module.

17 Claims, 7 Drawing Sheets

(51) Int. Cl.
*H04M 11/00* (2006.01)
*G10L 21/00* (2013.01)
*G10L 25/00* (2013.01)

(58) Field of Classification Search
CPC ............ G06F 17/2247; H04N 21/6125; H04N 21/4316; H04N 21/4221; H04N 5/44591; H04N 21/44222; H04N 21/4725; H04N 21/6582; H04N 21/8173; H04N 2005/4414; H04N 21/431; H04N 21/8545
USPC ... 379/265.09, 88.01, 265.02, 265.01, 88.18; 370/352
See application file for complete search history.

(56) References Cited

U.S. PATENT DOCUMENTS

| | | | | |
|---|---|---|---|---|
| 2004/0122941 | A1* | 6/2004 | Creamer | H04M 3/42059 709/224 |
| 2005/0129194 | A1* | 6/2005 | Creamer | H04M 3/24 379/88.18 |
| 2005/0286707 | A1* | 12/2005 | Erhart | H04M 3/2281 379/265.07 |
| 2006/0126803 | A1* | 6/2006 | Patel | H04M 3/5166 379/88.01 |
| 2006/0233326 | A1* | 10/2006 | Erhart | H04M 3/42221 379/88.16 |
| 2008/0112542 | A1* | 5/2008 | Sharma | H04M 3/242 379/1.02 |
| 2008/0144786 | A1* | 6/2008 | Wang | H04L 12/66 379/88.18 |
| 2010/0091960 | A1* | 4/2010 | Ervin | H04M 3/493 379/88.18 |
| 2010/0166158 | A1* | 7/2010 | Costello | G10L 15/22 379/88.04 |
| 2010/0226489 | A1* | 9/2010 | Sarkar | H04M 3/5166 379/265.09 |
| 2011/0091021 | A1* | 4/2011 | Adkar | H04M 3/493 379/88.11 |
| 2011/0293077 | A1* | 12/2011 | Dubut | H04M 3/493 379/88.04 |
| 2012/0045043 | A1* | 2/2012 | Timpson | H04M 3/493 379/88.04 |
| 2013/0094633 | A1* | 4/2013 | Mauro | G06F 3/0482 379/88.01 |
| 2013/0208881 | A1* | 8/2013 | Pande | H04M 3/5175 379/265.07 |
| 2015/0004947 | A1* | 1/2015 | Li | H04M 3/4931 455/414.1 |
| 2015/0227290 | A1* | 8/2015 | Lewis | G06F 3/04842 715/716 |
| 2016/0050317 | A1* | 2/2016 | Natesan | H04M 3/493 379/88.01 |
| 2016/0337516 | A1* | 11/2016 | Runyan | H04M 3/4935 |

OTHER PUBLICATIONS

Noble Systems Corporation, Maestro 2010.1.1 Manual, vol. 3: Reports, Aug. 18, 2010, pp. 1-124, Noble Systems Corporation, Atlanta, GA.

Cally Square User Advanced Guide, downloaded from http://www.callysquare.com/documentation/ on Oct. 10, 2015, 41 pages.

* cited by examiner

LIVE CALL DEBUGGING AND MONITORING TOOL FOR AN INTERACTIVE VOICE RESPONSE UNIT

BACKGROUND

Interactive voice response ("IVR") units (or simply "IVRs") are commonly used in contact centers to receive a call, play an announcement to the caller, present the caller with a set of menu options, and frequently collect a caller response to a menu option. The IVR provides an easy-to-use self-service platform that can be used to answer typical caller questions, which may be used determine the purpose of the call so as to better route the call. In many applications, the IVR may reduce the need for contact center agents.

In many instances, the IVR may have a sophisticated menu structure, providing for various levels of menus. This structure may reflect normal (e.g., non-error) user interactions with the IVR. In addition, the IVR may be programmed to account for each of the various possible types of errors that a user may cause during a call. Such errors may include entering a non-allowed input, entering a series of digits too quickly, waiting too long to respond to a prompt, etc.

Testing an IVR to ensure that the normal call flow interactions work property, as well accommodating all the possible abnormal interactions can be difficult for a developer. While some debugging tools allow a developer to test various scripts or menu flows by simulating a call to the IVR, such testing does not always identify all the possible problems that may occur when interacting with a live call. Invariably, effectively testing the menu options, response handling, and logic of an IVR requires the use of live calls interacting with the IVR under actual conditions to detect problems that a simulator may not always detect. However, using live calls can be time-consuming. This may require the developer to place a live call to a number to access the IVR, interact through a series of menu levels, and then select one of a plurality of menu options. Each time an option is selected, the user may have to terminate the call, and begin over to navigate to a same menu level to then select the next option. It would be much more convenient if a developer could somehow "back-up" a single menu level during the live call, rather than having to begin with another call to the IVR and repeat the interactions in order to return to the same location. While this capability could be provided to the caller as an IVR menu option, this may not always be possible. Thus, improved approaches are needed for being able to use a live call to debug an IVR and control navigation in the IVR separate from using the telephone. It is with respect to these considerations and others that the disclosure herein is presented.

BRIEF SUMMARY

Technologies are generally presented herein pertaining to systems, methods, and non-transitory computer readable media for controlling and tracking test calls in an IVR. In one embodiment, a user can originate a call to the IVR and simultaneously view a graphical user interface on a computer that also interacts with the IVR, where the graphical user interface provides a graphical representation of which menu options have been tested by the caller, current values of a selected variables used in the IVR, and/or a log of all actions performed by the IVR in handling the current call. In other embodiments, the user may invoke navigation control function that controls navigation of the IVR menu in ways that the caller cannot.

As is discussed in greater detail below, the subject matter disclosed herein may be implemented as a computer-controlled apparatus, a method, a computing system, or an article of manufacture such as a computer-readable storage medium. These and various other features will be apparent from the following Detailed Description and the associated drawings.

This Summary is provided to exemplify concepts at a high level form that are further described below in the Detailed Description. This Summary is not intended to identify key or essential features of the claimed subject matter, nor is it intended that this Summary be used to limit the scope of the claimed subject matter. Furthermore, the claimed subject matter is not limited to implementations that address any or all disadvantages noted in any part of this disclosure.

BRIEF DESCRIPTION OF THE DRAWINGS

Reference will now be made to the accompanying drawings, which are not necessarily drawn to scale, and wherein.

DETAILED DESCRIPTION

Figure 1:
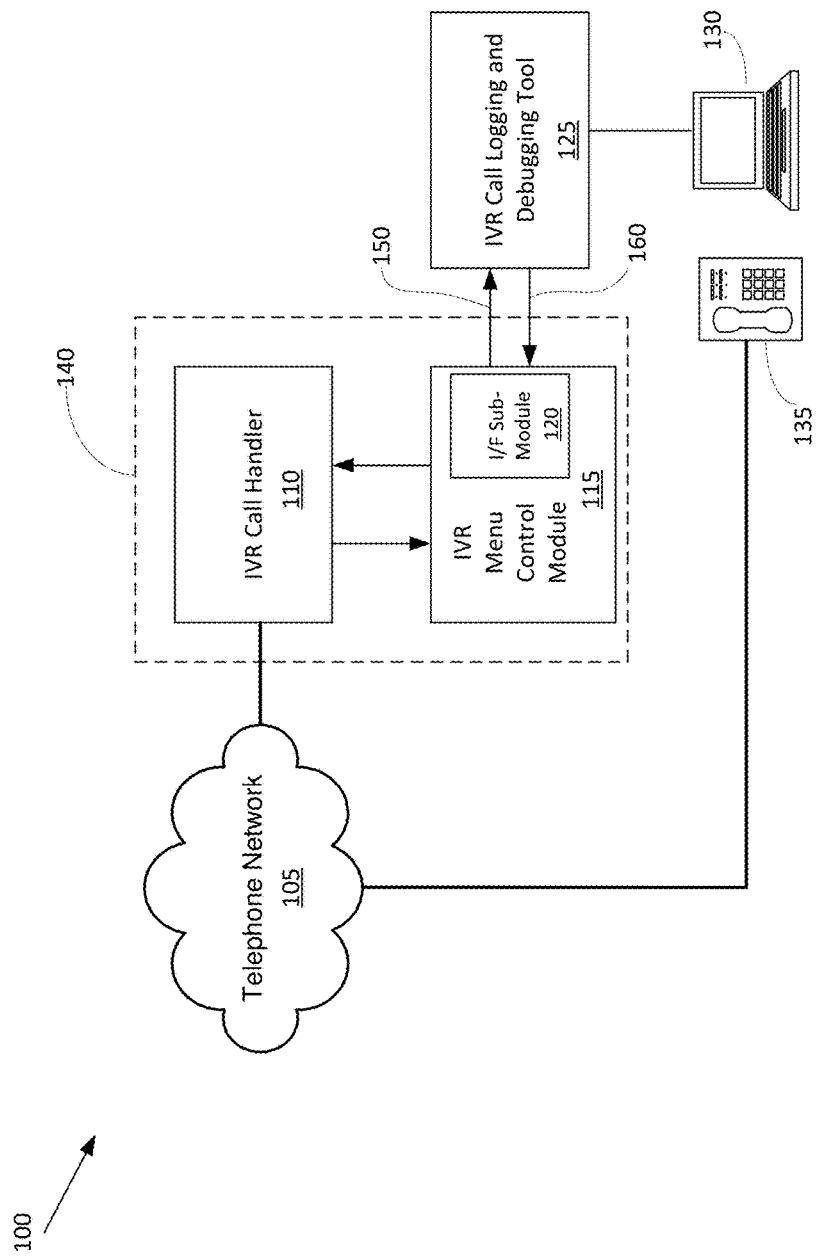
FIG. 1 discloses a high level architecture of the components used in one embodiment of the IVR Call Logging and Debugging Tool.

Various embodiments for practicing the technologies disclosed herein are described more fully hereinafter with reference to the accompanying drawings, in which some, but not all embodiments of the technologies disclosed are shown. Indeed, the embodiments disclosed herein are provided so that this disclosure will satisfy applicable legal requirements and should not be construed as limiting or precluding other embodiments applying the teachings and concepts disclosed herein. Like numbers in the drawings refer to like elements throughout.

Interactive voice response ("IVR") units are typically used to answer a call, provide the caller with information, or collect information from the caller. The information may be provided to the caller to fulfill a request or the information collected may be used to further direct how the call is to be subsequently processed. Use of IVRs can reduce the time a live agent is required to provide or receive information from the remote party. IVRs can thus serve a variety of purposes, from obtaining information to determine how to best route the call to an appropriate center or agent or provide information to the caller to avoid having to further route the call to an agent.

An architecture in which illustrates how an IVR can be used in conjunction with the IVR Call Logging and Debugging Tool ("CLDT") is shown in FIG. 1. This architecture 100 illustrates a specially configured development/testing IVR 140 that has been modified from a conventional IVR (or has the below mentioned capabilities incorporated therein) to interact with the CLDT 125. The IVR 140 is shown as interfacing with a telephone network 105, which may be a public switch telephone network, private network (e.g., a private branch exchange or PBX) or some other system/network capable of handling voice calls. The telephone network 105 may also interface with a telephone 135, which typically is a DTMF capable phone. In various embodiments, other types of telephone networks may be used, such as a wireless network, VoIP network, etc. Using these different networks may allow testing of the IVR under various real-life conditions and networks as would be encountered once the IVR is actually deployed.

The IVR 140 is shown in this embodiment as comprising two components. Other implementations may not necessarily be structured in this way and may have more or less components than shown. The IVR call handler 110 component performs functions related to call handling, such as answering the call, detecting a dual tone multiple frequency tone ("DTMF") if present, terminating a call, exchanging signaling messages, etc. A variety of protocols may be used by the IVR to interface with various telephone networks, such as analog lines, ISDN, VoIP, wireless, etc. Thus, a variety of different call handling protocols may be implemented. In many embodiments, there are no modifications required to the IVR call handler 110 in the IVR 140 in order for the IVR 140 to interface with the CLDT.

The IVR Menu Control module 115 handles the logic and defines the actions associated with the call as it navigates the menu. The IVR Menu Control module 115 defines which announcements are played, what options the caller has to indicate to select a menu option, and how to process caller input. This module may operate on caller input in the form of DTMF, speech, or both. This logic is typically independent of the particular telephone technology used (including the IVR Call Handler 110.) An example of an IVR menu is discussed below.

The IVR Menu Control module usually defines variables that are used to process a call. The IVR Menu Control module defines how the variables are populated and processed, what announcements are played, and the actions that are to be taken in response to caller input. These variables and other related information are exposed (i.e., made available) in real-time via the interface sub-module 120 to the CLDT 125. Thus, relevant information about values of these variables, values of the user inputs, information about where in the menu the user is currently located in the menu structure, et cetera, is provided to an external module, namely the IVR CLDT 125.

In this embodiment, the CLDT is an external module that, in part, provides "visibility" of the variable and state information to the developer for monitoring execution and testing of the IVR Menu Control module 115. This variable and state information can be presented by the CLDT 125 in real-time to the developer or program tester using a computer 130. Typically, the developer/tester is using the computer 130 and simultaneously operates the telephone 135. In order to test an IVR application, the developer can originate a call using the phone 135 into the IVR 140, and monitor the current status of the IVR variables and operation via the computer 130. Thus, as the developer/tester interacts with the IVR via the telephone call, the call may cause changes to the state of the IVR that the developer can observe. Typically, these changes are observe visually via the CLDT, but may also be manifested via the audio provided via the call. In other embodiments, the caller could be another individual, in which the user is monitoring the IVR's operation. When the CLDT user is a developer and initiating the call, typically this is for debugging purposes. On the other hand, when the CLDT is monitoring operation of other callers, this is frequently for monitoring purposes. Thus, the operation is similar for either testing or debugging, and may be turned on whether the caller is the same person using the CLDT or not.

However, the CLDT allows the developer to not only "see" the IVR status based on the caller's actions, but also to modify the IVR's state with respect to that call. Some of the modifications that the developer can make to the IVR's state are similar to those changes that the caller can make by interacting with the telephone. For example, the caller can respond to menu options to navigate from one menu function to another. The developer may be provided with a set of controls, a.k.a. navigation control functions, which allow the developer to navigate the menu using the CLDT. For example, the developer can also be provided a navigation control function to advance to the next menu function. Further, the developer can also be provided with control functions to control the IVR menu control module in ways that the caller typically is not allowed to.

Henceforth, the term "user" is used, which is synonymous with the developer, tester, or other person that is using the CDLT at computer 130. Thus, when referring to the "user" interacting with the IVR, this interaction occurs via the CDLT. When referring to the "caller" interacting with the IVR, it is the person operating the telephone that interacts with the IVR. As mentioned before, when debugging the IVR application, these may be the same individual.

To illustrate why a CLDT may cause a state change in the IVR on behalf of a caller, consider that a caller may be provided with a first level of menu options, and upon selecting an option, the caller navigates to the second level of menu options. Then, upon selecting a second level option, the caller is presented with a third level of menu options. The third level of menu options may not necessarily allow the caller to "go back" to the first level of menu options. However, the user may invoke navigation control functions via the CLDT that force the caller back to the first level of menu options. This allows the CLDT user to force the IVR into a particular state without having to interact using the telephone 135. As mentioned, this allows the CLDT user to interact with the IVR in ways that are not afforded to a caller in the IVR. As will be seen, this can be a time saving mechanism to facilitate testing of the IVR module.

For purposes herein, referring to "forcing the IVR into a particular state" or "placing the call in a particular menu location" refers to the same result. Other similar terms or phrases may be used to refer to "positioning" the call for purposes of being in a certain "location" or "point" in the overall IVR menu structure. The "menu structure" refers to the conceptual relationship of how various menu modules and/or functions are arranged with respect to caller interaction. This should become clear in light of the discussion further below.

To explain how allowing the CLDT user to control the IVR state can facilitate testing, consider a developer who is testing a third level of menu functions. The developer may need to observe and test the IVR at a certain point in the menu structure. To replicate operation deep in the menu structure, the user may be required to call into the IVR, interact with the first menu level, the second menu level, and then the third menu level. To replicate this (or to test the various options at the third level of menu options), the caller may be required to hang up and repeat all the steps. Thus, if the third level of menu options has several choices, the calls and navigation of the first and second level menus would have to be navigated a number of times.

However, allowing the developer to invoke a navigation control function from the CLDT at the third menu level to essentially "back up" one menu level would allow repeating the third level menu selection without having to re-navigate the other menu levels. If the developer needs to observe the IVR behavior again at that point in the menu, then the developer could invoke the "back up" control function again. This is simpler than the alternative of hanging up, calling the number, interacting with the first menu level, the second menu level, and the third menu level. Since testing may involve repeating a number of similar inputs deep inside the menu structure, the CLDT provides added flexibility to the developer to review a particular IVR state (or location in the menu structure where the caller is at) without having to replicate all the steps conventionally needed for the caller to get to that point. The navigation control functions offered to the user of the CLDT also allow the user to view and even alter certain variables that otherwise could not be altered by a caller via conventional menu navigation using a telephone.

Menu Structure

Figure 2:
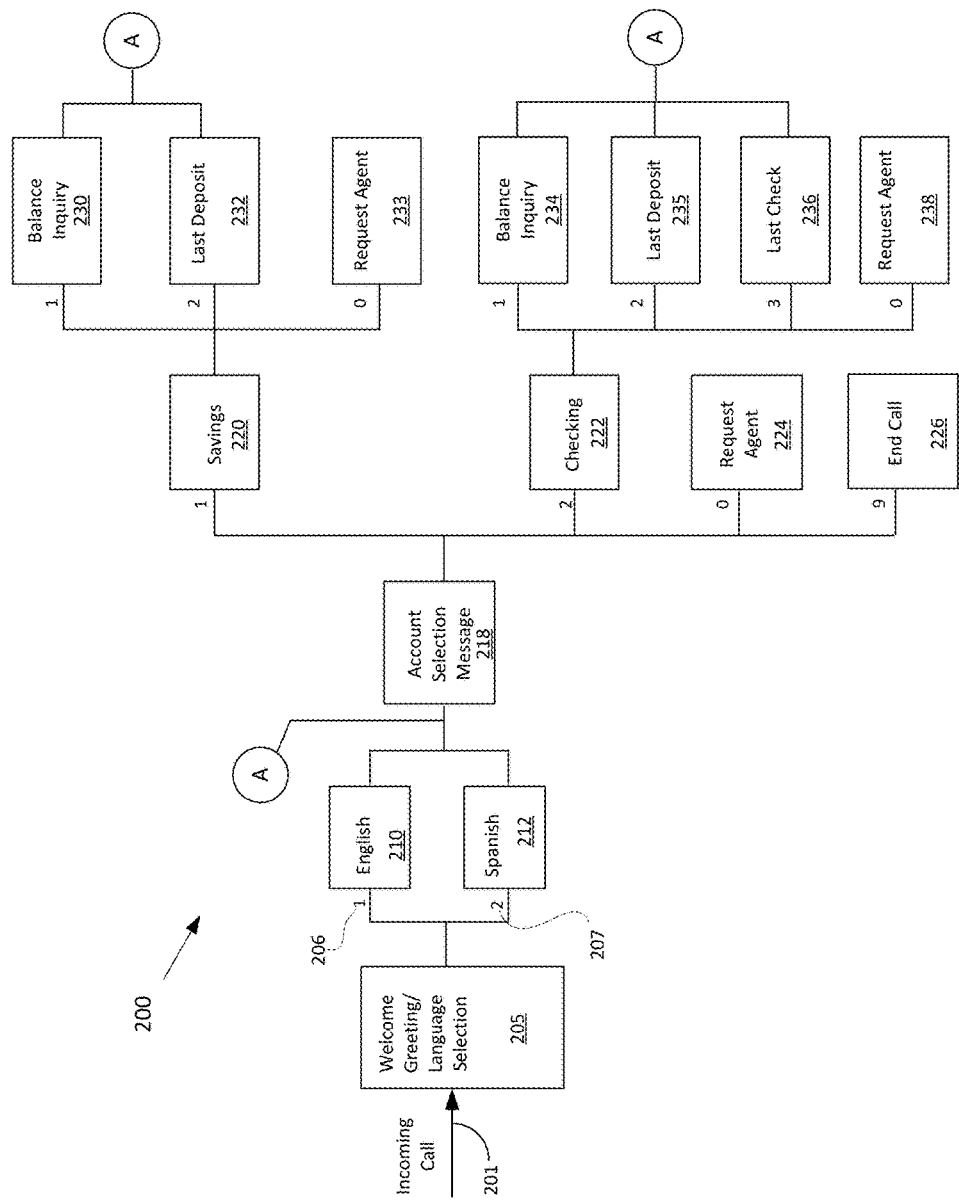
FIG. 2 illustrates one conceptual example of an IVR menu structure comprising a plurality of menu modules.

An example of a menu structure will serve to illustrate some of the concepts of the present invention and advantages that may be obtained. Turning to FIG. 2, an example of a very limited portion of a hypothetical IVR call flow is shown. This IVR call flow 200 shows a simplified call flow for a banking customer service application, which allows the caller (in part) to check the balance of their savings account and/or checking accounts, in addition to certain other functions, such as requesting to speak to an agent. The call flow shown is simplified from what would be required in a real-life deployment, but is sufficient to illustrate some of the inventive concepts. Those skilled in the art will recognize that many other IVR menu structures could be designed and developed for this and other applications.

The IVR menu structure 200 is illustrated by showing a series of "modules" which are a set of functions/actions performed in a related and coordinated manner. These are referred to as "menu modules" since they represent actions performed by the IVR which are grouped in a logical manner. It is not necessary that the underlying software implementing a menu module be structured in a corresponding modular form, but that may be the case. The "menu modules" represent a convenient human oriented grouping of functions. That being said, it is quite common for the software to be structured in a corresponding manner or some sort. For example, playing an announcement and collecting a caller response is a common function that may be used in various menu modules. When the capability is used to prompt the caller for a particular purpose, it may be given a name (e.g., language prompting or account selection). In various instances, menu modules may, in fact, represent a number of actions which are grouped together, for simplicity and ease of comprehension. For example, selecting an account balance may require actions of first identifying a user's account number and then retrieving the user's account balance. These could be considered as one collective action, or two separate actions. In other embodiments, more than two actions may be required to complete these functions. The exact scheme as to how actions are defined in an actual implementation, or what steps are included to perform a particular function, are not material to understanding the concepts disclosed herein.

Turning to FIG. 2, an incoming call 201 is logically represented as reaching the IVR at an initial menu module. This situation may be referred to as the "IVR receiving the call", or may be referred to as "where the call enters the menu structure." Because the overall menu structure comprises a grouping of menu modules, a call (or caller) can be referred to as "being" at a particular "location," which refers to the relative menu module that is currently servicing the call. Thus, reference to terms such as "location" or "point" refer to the current menu module handling the call. Similarly, the "call" or "caller" can both be referred to as "being" in a particular location in the menu structure.

In this embodiment, the "Welcome Greeting" menu module 205 plays a welcome greeting and prompts the caller for a language selection. This module may be referred to as the "Welcome Greeting/Language Selection" module, since it also prompts the caller for a language selection. In various representations of the menu structure in a diagram additional information may be conveyed to the developer, such as an announcement number that is played or a time duration of the announcement. This is not shown in FIG. 2, and those skilled in the art will recognize that various formats may be used to represent the operation of an IVR menu.

In this example, the announcement in the Welcome Greeting menu module may prompt the caller to say or enter a "1" or a "2" to receive English or Spanish prompts in subsequent announcements. Hence, the depiction of the "1" 206 represents the menu navigation path upon the caller entering or saying "1" for English prompts whereas the "2" 207 represents the user selecting Spanish prompts and is associated with another navigation path. In other depictions of the menu structure, other menu modules could be defined as analyzing the input. For example, this menu structure does not illustrate prompting the caller for identification and password information, which typically is performed. However, this particular simplified depiction of a menu structure is sufficient to illustrate how menu modules in a menu structure may be navigated by a caller.

The "English" menu module 210 may provide an announcement in English if selected, as may the "Spanish" menu module 212, if selected. Or, the menu module may simply represent the setting of a flag or variable in response to the caller's input. For example, once English is selected by the caller, then a language flag may be set to "English" or "true" in menu module 210. In other embodiments, the menu module may represent both playing an announcement and setting the variable value, or two separate modules (operating in series) could have been defined. Those skilled in the art will recognize that a great deal of flexibility exists in how menu modules may be defined for a menu structure.

However, it is clear that once the user has selected a language, and either the "English" menu module 210 or the "Spanish" 212 menu module has been navigated, a variable value is selected so that subsequent announcements are provided in the appropriate language.

The next module that is encountered is the "Account Selection Message" module 218 that plays an announcement to the user. This is to prompt the caller to select a particular type of financial account that the user is inquiring about. For purposes of this example, the user can select "1" which selects a savings account. If so, the caller enters the "Savings" menu module 220. If the user indicates "2", they are selecting their checking account and the caller is lead to the "Checking" menu module 222. In this example, the user may be prompted to speak with an agent. If the user indicates "0", then the user is requesting to speak with an agent and the caller navigates to the "Request Agent" menu module 224. Finally, if the user indicates "9", the call is ended by navigating to the "End Call" menu module 226.

If the user selects "1" and proceeds to the "Savings" menu module 220, then the user is prompted as to whether they would like to inquire of the current balance by indicating "1" proceeding to the "Balance Inquiry" menu module 230. If the caller would like to inquire of their last deposit, they may indicating "2" resulting in them proceeding to the "Last Deposit" menu module 232. After either of these options, the flow continues to label A, which returns them to the "Account Selection Message" menu module 218. If, at the "Savings" menu module 220, the user did not wish to inquire about their balance or deposit information, they could have selected "0" to speak to an agent and this would proceed to the "Request Agent" menu module 233.

It should be clear at this point how menu navigation occurs at the "Account Selection Message" menu module 218 had the caller selected "2" for checking, which would proceed to the "Checking" menu module 222. Similar functions for inquiring about their checking balance and deposits are shown (menu modules 234, 235) as well an additional function for inquiring about their last check (menu module 236) and requesting an agent to speak with (menu module 238). The actions taken with the "Request Agent" menu module 224 and "End Call" menu module 226 are self-evident.

In each of the menu modules, a number of variables, actions, and functions may occur. For example, when requesting to speak to an agent, a function call for the current time may be made. This allows the IVR to know whether the call center is closed. If so, the caller may be played an announcement indicating the call center is closed and no agents are available. If the call center is open, the IVR may query as to the average wait time, and if it exceeds a threshold, the IVR may inform the caller of the long wait time, and ask the caller if they wish a call back. Similarly, if the "Balance Inquiry" menu module 234 is accessed, the actions performed may include querying as to whether the caller has multiple accounts, and if so, prompting the caller for a particular account number. If there is a single account, then these steps may not occur, and instead, a query for the account balance may be made.

As can be seen, each menu module may require accessing previously determined variables, ascertaining new variable values, initiating database queries, obtaining further information from the user or other systems, etc. For example, when playing the announcement for the balance inquiry at menu module 230, the system will have to ascertain the correct language (English or Spanish). This may necessitate a check as to how that variable was previously set during the menu navigation. Other variables may be determined only after processing by a specific module. For example, determining the current checking account balance typically only occurs after the user has entered this menu module.

Using this example shown in FIG. 2, it can be shown how a CLDT user accessing various navigation control functions can simplify testing of the menu navigation. Assume the developer desires to check whether the appropriate announcements are being played. Ideally, the developer would like to hear the prompt via the phone both in English and Spanish for all menu modules where a greeting is played. In a conventional approach, the developer could call into the IVR, listen to the welcome greeting (menu module 205), select Spanish for the language (menu module 212), listen to the account selection message (menu module 218) in Spanish, select their savings account (menu module 220), and then select balance inquiry (menu module 230) to hear the balance in Spanish. The menu flow indicates that the user is then returned to label A (menu module 218). However, if the developer wants to hear the savings account balance inquiry in English, they would have to terminate the call, call back into the IVR, select English as the language, and proceed to the savings account (menu module 220) and the balance inquiry (menu module 230). The caller has no way to alter the language flag once in the menu structure and is required to re-enter the IVR menu back at the beginning.

Ideally, the developer would instead, once they hear the Spanish announcement of their balance in menu module 230, invoke a control function to "go back" to the "Balance Inquiry" menu module 230 and set the language flag to English. Then they could hear the balance announcement provided in English.

To illustrate another example, consider that there is a bug in the operation of the IVR when the caller reviews the status of the last written check against their checking account. This corresponds to the "Last Check" menu module 236. The caller must navigate, for example, from menu module 205, 210, 218, 222, and then to 236. If the caller desires to return again to the "Last Check" menu module 236, they must return to label A (e.g., menu module 218), and select again menu module 222 and module 236. It is not possible for the user to simply return back directly to menu module 236 to verify whether the bug exists.

The IVR menu structure shown is relatively simple. In practice, the IVR menu structures may be more complicated than shown, and navigating the menu structure may be more complex. To test a particular portion of the menu structure by having to return to the very beginning, e.g., the incoming call entry point and then navigate through the menu structure to the desired location, can be very burdensome and time consuming.

One approach for facilitating testing is to allow the developer to "back up" to a prior menu module for a current call. This may involve the CLDT logging all the variable values and state information upon entry to that menu module so that these values can be used when reentering that menu module. For example, assume the developer enters the "Last Check" menu module 236. At the beginning of entry of that menu module, the CLDT could read all the values of the variables and any state information used in the IVR application. As that menu module is executed, the values may be altered and other state information modified. The developer could invoke a "back up" navigation control function on the CLDT, which directs the IVR Menu Control Module to return to the beginning of the Last Check menu module 236 using the saved variable values and state information. Thus, the call is being processed just as it was when it entered the "Last Check" menu module previously. In summary, a developer using the CLDT could initiate a call to the IVR, navigate to a specific menu module, and re-execute the logic several times at that menu module by invoking the "back up" navigation control function. Thus, the call is positioned, so to speak, back at the "Last Check" module with the variables and state information as was previously defined.

In order for the user of the CLDT to debug an IVR application, the user (e.g., developer) may require visibility to various variable values. Examination of their current values can provide insight as to why the IVR's operation is not as expected. However, to make sense of these values and debug the IVR application, the user needs to know when in the call flow (e.g., at which menu module) a particular value was set. Further, the user may desire to review a written log of the actions performed during a call, which may involve reviewing which menu modules were encountered with respect to time, and what actions each menu module executed. It is important that this be viewable by the user in real-time, since the user is also controlling navigation by interacting with the IVR using the telephone. For debugging purposes, the user needs real-time visibility to the IVR's variables and actions. For monitoring purposes, the user may find the log more useful.

Using the Call Logging Debugging Tool

Figure 3:
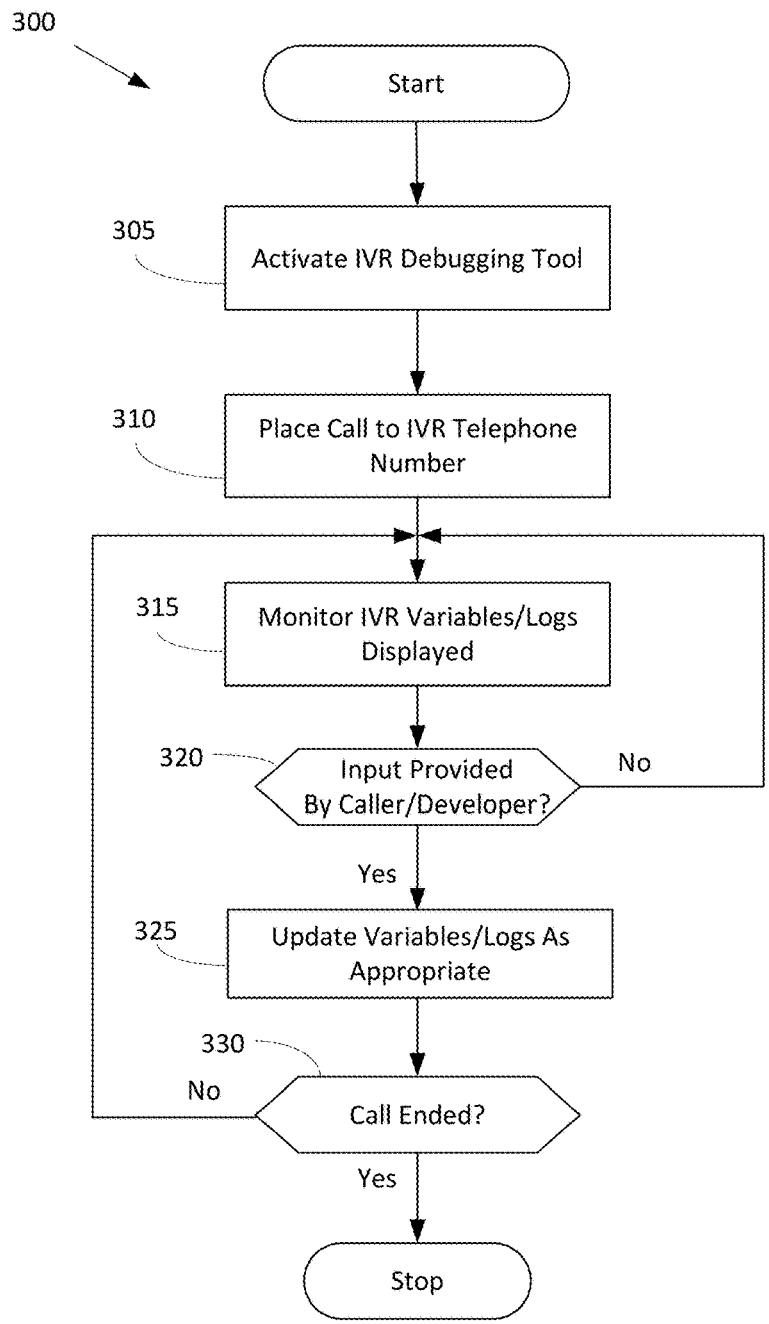
FIG. 3 illustrates one embodiment of a user using the IVR Call Logging and Debugging Tool to monitor or test an IVR's processing of a call.

FIG. 3 illustrates, at a high level, a process 300 for using the CLDT to debug or monitor a live call to the IVR. It is assumed that the developer has installed (or developed) the IVR Menu Control Module 115 with the appropriate interface sub-module 125 into an IVR 140 and interfaced with the CLDT 125. The developer must activate the IVR CLDT in operation 305, which involves in part configuring the CLDT to identify which variables in the IVR application that are to be monitored and presented to the developer on the computer.

Once the CLDT is configured to monitor the IVR application (specifically, the IVR Menu Control module), a call can be placed to the telephone number associated with the IVR in operation 310. Typically, the developer uses a telephone in close proximity to the computer, so that the developer can both call the IVR using the telephone and view in real time the values of the variables presented by the CLDT, as represented in operation 315. The developer may then listen to the announcements provided by the IVR and when appropriate, provide input to a prompt using the telephone in operation 320. If no prompts are provided, the developer can return to operation 315 and continue to monitor the operation of the IVR using the CLDT. If input is provided at operation 320, the IVR application will act accordingly by updating the appropriate variables and state information in operation 325. These values, in turn, may be presented to the developer using the CLDT. If the call has not ended in operation 330, then the user returns to operation 315 where the updated variables and state information are reviewed in operation 315.

In this manner, the developer can cause a call to be received by the IVR, review in real time the state related information of the IVR application, interact using the telephone with the IVR application, and review the updated values. This represents a simplified use of the IVR CLDT for monitoring a call. In a debugging application of the IVR CLDT, the input received in operation 320 may be provided by the developer, not using the telephone, but via the CLDT. The developer may indicate one of various navigation control functions that impact the variables and state information of the IVR application. More about this capability is discussed below.

Figure 4:
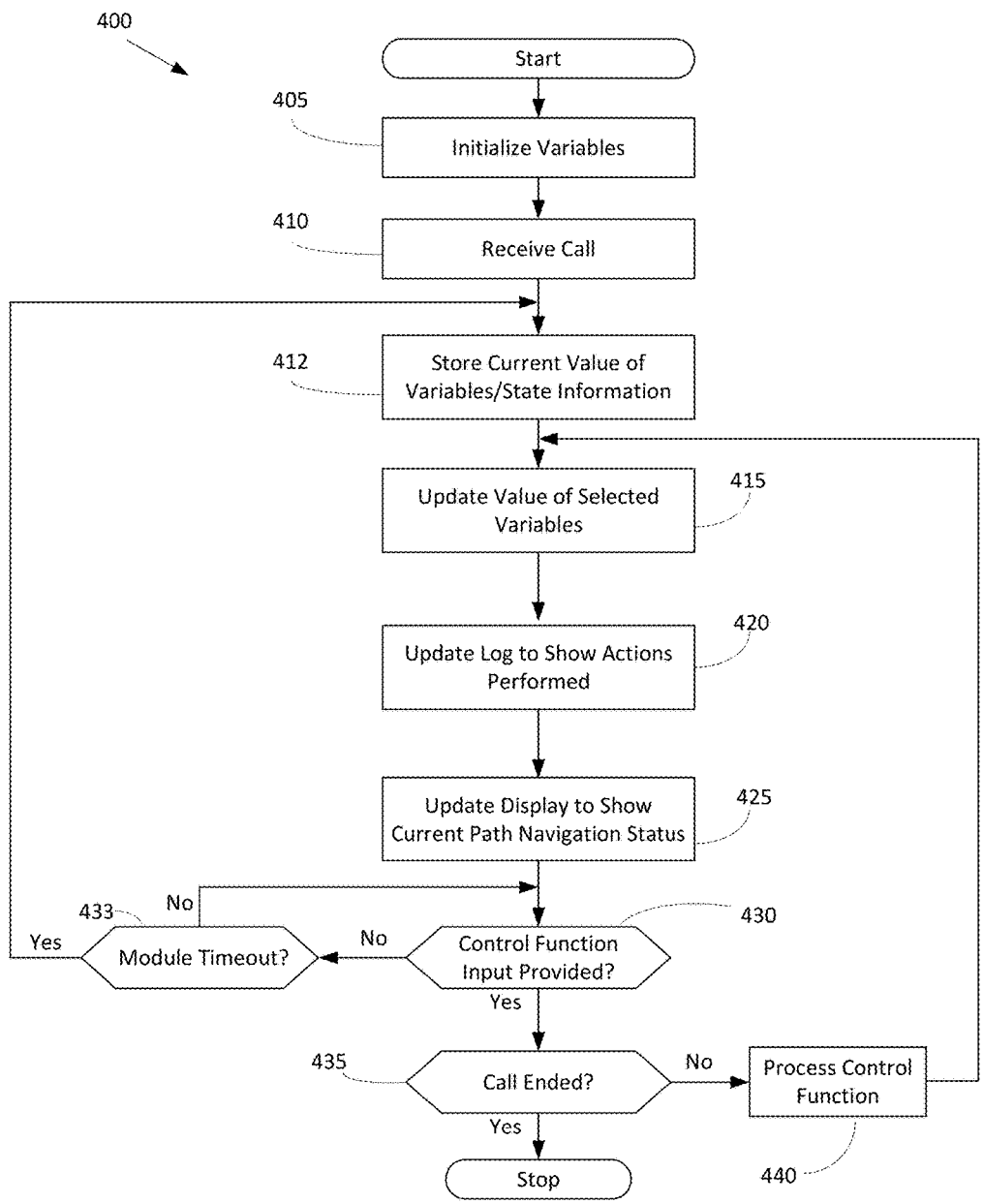
FIG. 4. illustrates one embodiment of a process flow used by the IVR Call Logging and Debugging Tool to monitor or test an IVR's processing of a call.

Turning to FIG. 4, a process flow 400 is shown that illustrates various operations that are performed by the IVR Menu Control module 115 and the CLDT 125. Because the IVR CLDT 125 monitors and presents values of variables that are determined by the IVR Menu Control module, the operations between these two modules are closely intertwined.

The process begins with initializing the values of variables in operation 405. These variables are defined in the IVR Menu Control module, and since they are mirrored in the CLDT, these values may be initialized in both modules at the same time. Thereafter, once a variable is altered in the IVR Menu Control module 115, it will be copied or read by the CLDT 125, so that a current copy is maintained by the CLDT.

A call is then received by the IVR Menu Control module in operation 410. This causes the first menu module of the menu structure to be executed. Prior to beginning a menu module, or upon entry to a menu module, the current values of the variables and state-related information are stored in operation 412 by the CLDT. These values may be required when the user invokes a navigation control function to force navigation to a given menu module. This allows the calls to be processed as it had been when it originally entered the menu module. This allows the caller (e.g., the user in this case) to interact with the IVR in a similar state as when the call previously first entered the menu module.

The next operation 415 is defined by the IVR Menu Control module based on the particular IVR application. The processing that occurs is dependent on how the particular menu module is defined. Typical operations include updating values of specific variables, reading data, and processing data to derive a result, etc. For example, if the menu module is a language selection module, then the operation may be simply setting the language selection flag variable. If the menu module is to read account balance information, then queries may have to be issued to read a particular account value. The determination of what values a variable might be set to may be predicated on receiving caller input, initiating queries, processing data, etc.

When the CLDT is initially configured, it is typically configured to track or log certain variables that are of importance to the developer. Whenever a variable is updated, an input is received, or a state variable is altered, a test may be made to see if that variable is one of the variables that is to be tracked in a log file. Thus, in operation 420, information in log, such as an event log, is updated to reflect any changes or actions performed. This may also be presented to the developer by the CLDT onto the computer workstation in real time in operation 425. Thus, as various steps in a menu module are performed, the user may see the status of select variables or other state related information of the variables selected to be presented. This allows the user to track desired information as a call is processed in each menu module.

There may be a number of actions performed in a module in the menu structure. However, typically, once performed, the module will provide some feedback to a user. For example, one form of feedback is providing an announcement. This announcement may provide the information desired by the user, or signify an action has been completed. In many cases, another announcement may be played to the caller prompting them for another input, to indicate what action they now want to be performed.

After a menu module has provided this announcement and is awaiting caller input, this is a convenient point during the menu navigation for the CLDT user to provide a navigation control function input, as shown in operation 430. A control input function controls the navigation in the menu structure, typically allowing the user to jump to a particular menu module. For example, the aforementioned "back up" function could be considered as a navigation control function. If the CLDT user provides a navigation control function as input at this point in operation 430, the next step is to determine if this is to end the call in operation 435. If so, the call ends. Otherwise, the control function is processed in operation 440, and the flow returns to operation 415.

If no control function is provided at operation 430, then a next step determines if there is a menu module timeout in operation 433. Recall that there is a call active with the IVR awaiting input, and typically there are routines to handle a timeout condition if there is no response provided by the caller. For example, if the module prompts the caller for information, and there is no input received, eventually a well-designed IVR application will timeout and take some action. (This would also be a convenient time for the user to enter a "pause" navigational control command, which is discussed below.) Otherwise, the process returns to operation 430, which awaits a control function input.

If the module does timeout in operation 433, then likely a new module is entered. This results in returning to operation 412, where the new current values of the variables are stored by the CLDT. In essence, the CLDT "shadows" the information stored by the IVR Menu Control module, and can command the IVR Menu Control module to go to a particular menu module by processing a navigating control function input from the user. Navigating to a new menu module may require setting the values of the variables in the IVR Menu Control module as instructed by the CLDT for that menu module.

Graphical User Interface

Figure 5:
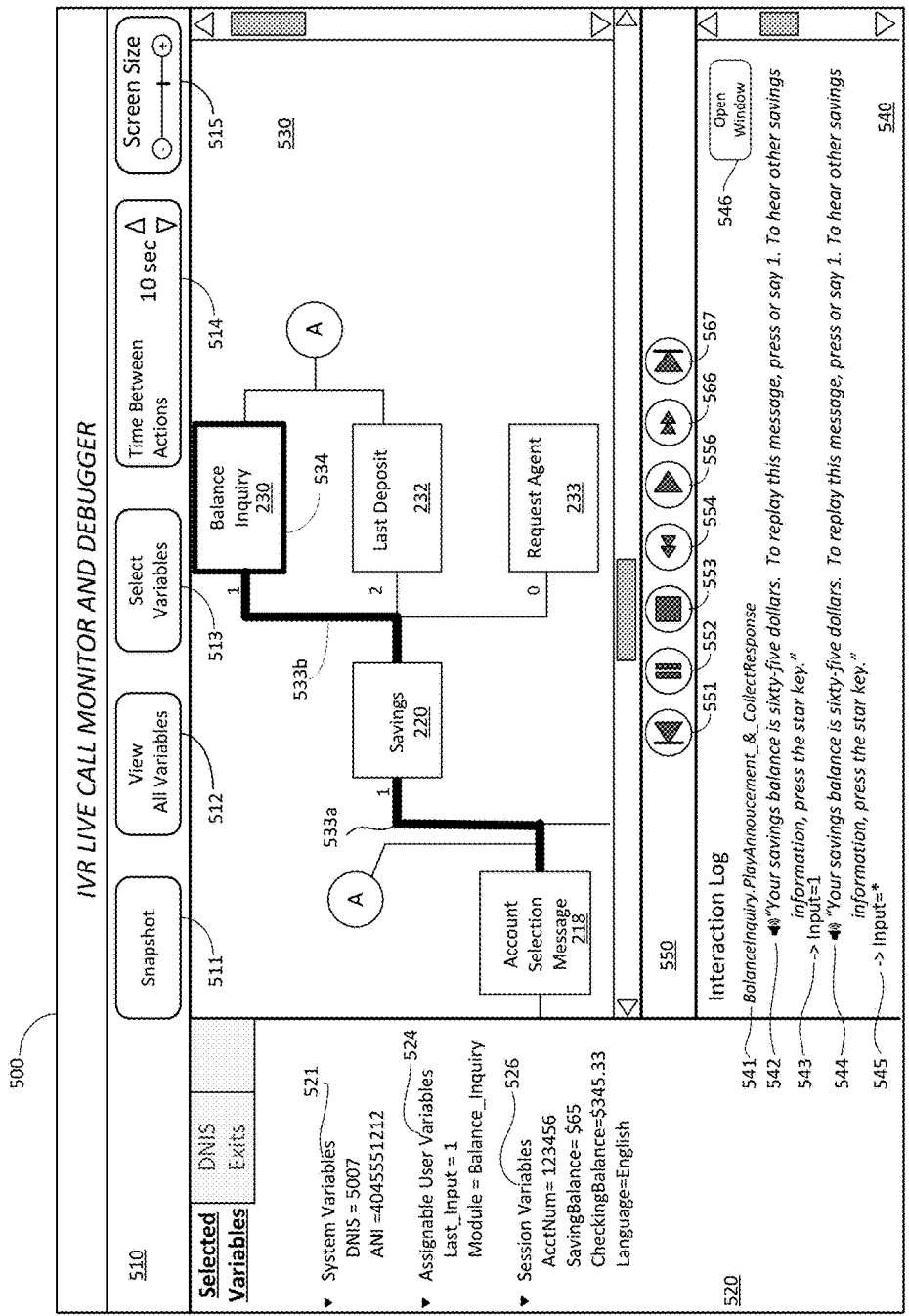
FIG. 5 illustrates one embodiment of a graphical user interface provided by the IVR Call Logging and Debugging Tool to monitor or test an IVR's processing of a call.

FIG. 5 illustrates one possible graphical user interface ("GUI") of the IVR CLDT that can be used during debugging and/or monitoring of an IVR interaction. Typically, this screen will be used by a developer to monitor the progression of the call through the IVR menus, along with the actions performed and the value of variables at each step. Further, the CLDT user may also control the origination of the call into the IVR, so the user can control the navigation of the call either by interaction with IVR via the phone or via the computer/CLDT module. The CLDT module could be executing on the IVR 140 itself, on the computer 130, or on a separate processing system.

In this embodiment of the GUI, there are five panes or sections on the screen 500 that contain information related to the IVR and call navigation. The function pane 510 provides the user with the ability to invoke various functions related to the operation of the CLDT. One function is the "Snapshot" function 511 that allows the user to save the values of the variables in the IVR at an indicated moment in time. This is useful because it allows the user to selectively save the values when desired, which may be easier than reviewing a log of all the values over a time period to ascertain the value at a particular point. The "View All Variables" function 512 allows the user to view the values of all variables as opposed to a previously selected subset of variables. The user may choose to focus on a subset of variables (the selected variables), but may have on occasion the need to view other variables, which were not selected. Depending on how this value is set, the appropriate variables will be displayed in the variable viewing pane 520.

The "Select Variable" function 513 allows the user to select which of the variables used in the IVR Menu Control module are to be displayed in the variable viewing pane 520. The "Time Between Actions" function 514 allows the user to control the speed at which the IVR Menu Control module executes the actions in a given module. As will be discussed below, the CLDT can in effect control the rate at which the IVR Menu Control module steps through actions in a menu module. In this example, it is set to 10 seconds for each action, which allows the user that amount of time to view the values of the variables in real time before they may change. Finally, a "Screen Size" function 515 controls the scale of the menu viewing pane 530. One skilled in the art may define other or additional functions which the user can access to control and configure the operation of the CLDT.

The menu viewing pane 530 is the main pane, which shows the current portion of the IVR menu structure that the caller is interacting with. In this example, the menu viewing pane 530 shows a section of the IVR menu from FIG. 2, and specifically shows modules 218, 220, 230, 232, and 233. Expanding or reducing the scale allows fewer or greater number of modules to be displayed. Conventional cursor controls (e.g., slider type controls) may also be made available to the user to view various portions of the menu structure.

The variable viewing pane 520 indicates the current real-time value of various variables used in the IVR Menu Control module. In this example, different types of variables are shown. The system variable 521 may be values set a system level, which always apply for this IVR menu. The assignable user variables 524 are values which allow the user to assign the value. Finally, the session variables 526 are values associated with this particular session or call. Various embodiments may group or otherwise categorize the type of labels and how their values are indicated.

As a call progresses through the IVR modules (i.e., navigates through the menu structure), the value of the variables displayed in the variable viewing pane may change value. The variables displayed may be all the variables, or a subset of all the variables, depending on how the CLDT is configured. The current value of a variable is shown to the user along with the name of that variable, so the user can view the value of the variable at any given time. This allows the user to detect any anomalies or unexpected values during processing of the call. The user may invoke the "snapshot" function to capture values of interest.

The navigation control function pane 550 displays various functions, which the user can invoke to alter the processing or navigation of the call in the IVR. The number of inputs and their corresponding function can vary in different embodiments. Not all embodiments require all the navigation control functions shown in FIG. 5.

The first navigation control function is the "previous checkpoint" function 551. Invoking this function will move the current navigation position to that prior module. The user can define a particular point (e.g., a prior menu module) in an IVR menu as a checkpoint, or marker. Typically, indicating a checkpoint marker with a menu module is associated with the beginning of that particular menu module. The prior module that is marked by the checkpoint could be the immediately prior module or several modules earlier from the current module, including those which were not in the prior menu navigation flow. Thus, for example, the call may be currently located at the "Balance Inquiry" menu module 230. The user could have defined a prior checkpoint at the "English" menu module 210, and invoking this function will position the call as it had just entered the "English" menu module 210.

The "next checkpoint" navigation control function 567 is similar in function, but advances the call to a checkpoint deeper in the menu structure. One possible approach for modeling whether a menu module is "deeper" or "previous" to a current menu module is to imagine a vertical line in the menu structure of FIG. 2 corresponding to where the call is currently positioned. Any checkpoints defined to the right of that vertical line are "deeper" checkpoints that can be reached using the "next checkpoint" function. Any checkpoint defined to the left of the vertical line are previous checkpoints that can be accessed using the previous checkpoint function 551.

The "pause" navigation control function 552 suspends execution of operations on a call in the current menu module. Thus, if the menu module is prompting the caller to enter information, entering the "pause" function 552 will interrupt the announcement and associated timers. If the announcement has just completed, then the menu module may be running a timer waiting for user input. If so, the "pause" function will suspend that timer.

The next navigation control function is the "reset" function 553. This function will interrupt processing and place the call at the initial point of entry into the IVR (e.g., the first menu module). Using FIG. 2 as an example, this would reset processing back to the "Welcome Greeting" menu module 205. This essentially allows the use to start over, but without having to hang up and originate a new call to the IVR.

The "rewind" navigation control function 554 moves the call to the prior menu module relative to the current module. If selected twice, it will move the call to the second prior menu module, and so forth. Thus, looking at the example in the menu viewing pane 530, if the user is currently at the "Balance Inquiry" menu module 230, and invokes the rewind navigation control function 554 once, this will place the call at the "Savings" menu module 220. If invoked again, the call will be moved to the "Account Selection Message" menu module 218.

The "play" navigation control function 556 indicates to start executing the actions associated with the current menu module that the call is associated with. The user can stop execution using the pause function, and restart it with the play function.

The "advance" navigation control function 556 advances the call to the next menu module. This can be conceptually viewed as moving the call to the next module that is positioned to the right of the current module, which typically is the first option selection. Since there may be multiple menu modules at this point (representing different user elections), one embodiment will select the upper most menu module. If the function is selected again, the next highest module may be selected (e.g., the second election), and so forth. For example, turning to the "Savings" menu module 220 shown in the menu viewing pane, selecting the advance navigation control function 556 will select the "Balance Inquiry" menu module 230 first, and if selected again, it will select the "Last Deposit" menu module 232 next, and then the "Request Agent" menu module 233. Once the desired menu module is selected, the user could invoke the play navigation control function to cause execution at that point in the IVR menu to occur.

It should be evident that these navigation control functions cause the call to be "moved" or navigate to various locations in the menu structure. This allow the user to move a call directly to a particular menu module. Then, execution can resumed and the user can inspect and observe the variable values at any point in the menu structure.

Finally, the log viewing pane 540 displays a log of the actions performed by a menu module. These actions may involve processing inputs, playing announcements, querying a source for information, etc. Whatever the actions that are defined in a menu module can be recorded in the log allowing the user to review the actions taken. In the example shown in FIG. 5, a first label 541 indicates the name of the current module. The next line 542 indicates that an announcement was played, and replicates in text the substance of the announcement. The next line 543 indicates an input was received, and its value. The next line 544 also indicates an announcement was played, and the last line 545 reflects the caller's response. If more lines need to be reviewed, the "open window" function 546 allows a separate and larger window to be used for viewing the logged results.

In other embodiments, the logged results can be exported as a file, which can be reviewed using conventional editors or similar application programs.

It should be evident that by using this debugging tool, the user can initiate an actual call into the IVR and observe the value of variables, the actions performed, view where the call is relative to the overall menu structure, and control how the call will be processing in the IVR. This provides sufficient tools for the user to debug or monitor the operation of a call in an IVR, while knowing what happens at each step in the IVR.

Additional capabilities are provided in the CLDT to facilitate testing of a call in the IVR. The user typically may need to navigate the different modules in the menu structure to ensure that all modules are working properly. In complex menu structures, it may be easy for the user to forget which modules have been visited, and which module the call is currently being processed by. To aid the user, various visual-oriented mechanisms can be employed to aid the user. These typically involve using different colors, shapes, icons, thickened lines, fonts, etc. Turning to FIG. 5, the menu viewing pane 530 shows a thickened line 534 (which could be in a different color) around the "Balance Inquiry" menu module 230, which indicates that the call is currently positioned in that menu module. The thickened lines 533*a* and 533*b* indicate the path taken to reach the current menu module. Thus, if the user needs to test all the menu modules, the user knows via these visual indications that they have already visited the "Balance Inquiry" menu module 230. The user can use the navigation controls to back up to the "Savings" menu module 220 or advance to the "Last Deposit" menu module 232 to test it as the next module. Thus, appropriate visual indications allow the user to know what they have tested, what paths they took, etc. A function key could be provided (not shown) allowing the user to reset all these visual indicators.

While a user can test an IVR solely by interacting with the application using a telephone, the CLDT allows the user to test the IVR using a live call faster and more efficiently. The user can view in real time what any variable is set to, which announcement have been played, they can visually see where they are in the overall IVR menu structure and can directly control the navigation in ways that may not be allowed using the telephone.

Interface Between the IVR Menu Control Module and CLDT

In order to monitor the value of the variables in the IVR, as well as control navigation, an application programming interface ("API") may be defined between the IVR Menu Control module and the CLDT. The API is relatively limited, as only a few capabilities may be required to achieve the desired functionality. The API could be could be developed in an IVR that is dedicated to development/testing purposes, or the API could be included in production IVRs so that remote debugging of IVRs is possible. If so, additional security procedures may be warranted to ensure that proper authentication occurs before granting control and access to the IVR to a third party. Further, those skilled in the art will recognize that the functions defined in the API below could be accomplished in a variety of ways, and that the messages/commands described below are only one approach of other variations as to how the functions could be performed. In some embodiments, the functions of the IVR Menu Control and the CLDT are integrated into one module, so no API is required.

Figure 6:
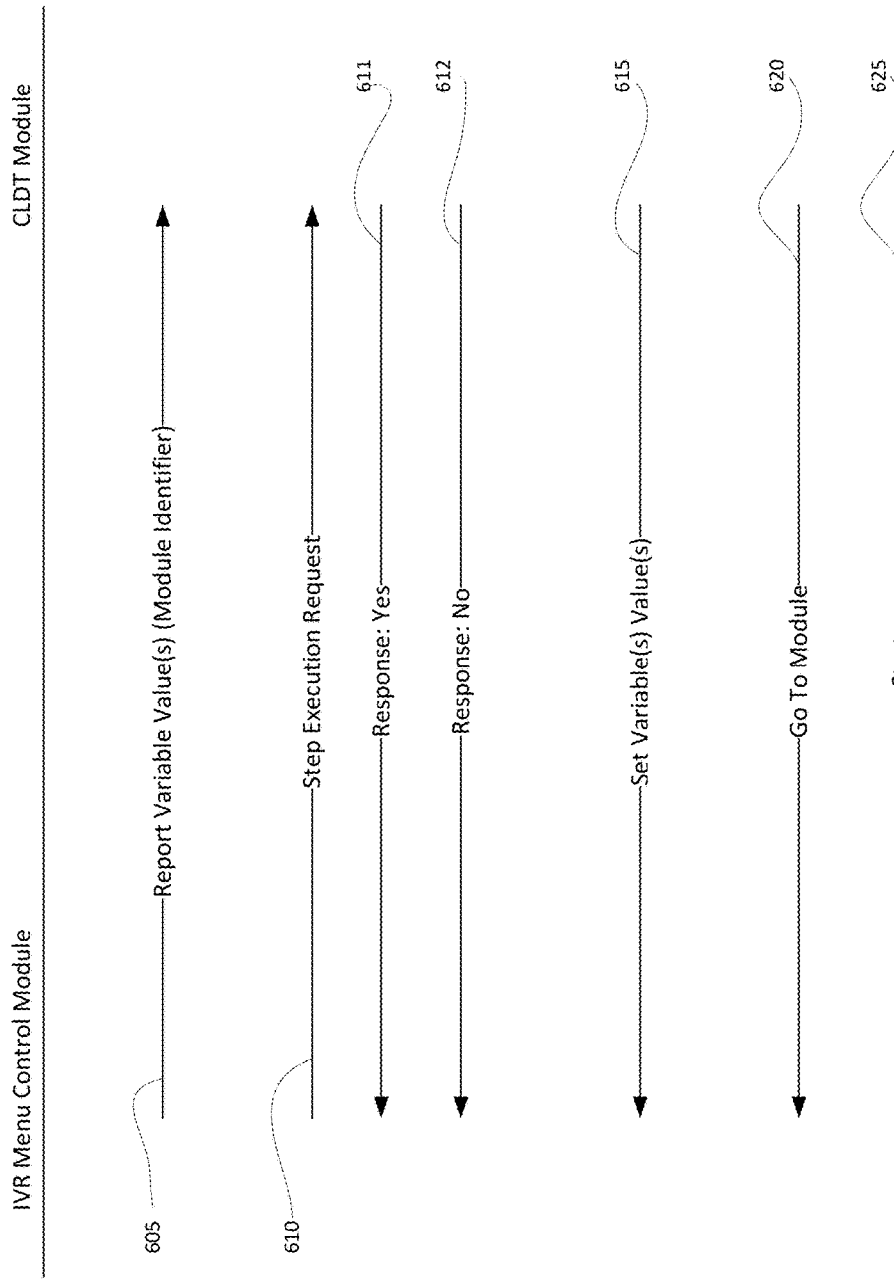
FIG. 6 illustrates one embodiment of various messages that may be defined in an application programming interface used in conjunction with the IVR Call Logging and Debugging Tool.

FIG. 6 illustrates potential messages that can be defined between the IVR Menu Control module and the CLDT.

These messages may be sent at various times as described below, and can be used to allow the CLDT to "shadow" the information maintained in the IVR Menu Control module and further allow the CLDT to "force" a call to be navigated to a particular menu module in the IVR.

One such message in the API is the Report Variable Value(s) 605. This message indicates the current value of one or more variables and is sent from the IVR Menu Control module to the CLDT. The value of the variables reported must be associated with a given point of when the call is in the IVR menu. Thus, one approach for conveying this information is for the CLDT to send the variable values when the call first enters a menu module along with an identification of that menu module.

In one embodiment, this message is sent by the IVR Menu Control module each time a menu module is entered by a call. The menu modules may be identified by number, name, or some other convention. Thus, when the IVR receives the test call, which is initially handled by the Welcome Greeting menu module 205, the value of the variables are sent to the CLDT along with an indicator that it was for the Welcome Greeting menu module. Next, when the user selects a language and the call enters either the English menu module 210 or the Spanish menu module 212, the variable values are sent again with an indication of the corresponding menu module. Next, the call enters the Account Selection Message menu module 218, and the values are sent again to the CLDT along with the menu module identification. Assuming that the caller selects their savings account, the next module is the Savings menu module 220, and the variables are sent again to the CLDT. The CLDT now knows the sequence of modules that the caller has navigated in the IVR and knows the variable values each time the call entered a particular menu module.

This information is used by the CLDT to display the current position of the call in menu structure on the GUI. Further, because the CLDT knows the path the call has navigated in the menu structure to arrive to the current menu module, the CLDT can indicate this via bold lines (or other visual markers) to the user. See, e.g., lines 533a, 533b, and 534 in FIG. 5. Further, if the user desires to navigate backwards to a particular menu module and re-enter that menu module, the CLDT knows what the variables values were upon entry to that menu module and can command the IVR Menu Control module to set those values.

The Report Variable Value message 605 can also be sent by the IVR Menu Control module when a variable is modified during processing in a module. Thus, after a caller enters a module, additional processing may occur that results in changing a variable's value by that menu module. This change can be reported to the CLDT so that the CLDT can display in real time the current real-time value of this variable, if appropriate, to the user.

The next message is the Step Execution Request 610. This message is sent by the IVR Menu Control module to the CLDT to request permission to execute the next step in a menu module. This message may also identify the action or step that is requested to be taken. In response, either a "Response: Yes" message 611 or "Response: No" message 612 will be returned by the CLDT. This allows the CLDT to control the pace of execution of the IVR on a step-by-step basis. In some embodiments, the CLDT will automatically authorize execution of a step based on a timer, which allows the user to observe the execution at a human-friendly pace without responding. If execution of a given step results in altering a variable value, then a Report Variable Value message may be sent as well, allowing the CLDT to update that variable's value. In other embodiments, the user may control the execution of each step by selecting a function key that results in the "Response: Yes" message to be sent. If a "Response: No" message 612 is received, the IVR Menu Control module may pause execution (and pause any associated timers) until a Start message 625 is received.

Because the Step Execution Request indicates the type of action to be taken, this allows the CDLT to generate a log of the steps executed. This can also be displayed in real time to the user via the log viewing pane 540. The Step Execution Request can also be used to report user inputs, even though technically that may not be considered an action executed by the IVR. (Alternatively, the message may be characterized as requesting authorization to process a received user input.) These messages and associated replies allow the CLDT to control the pace of execution of the IVR, allowing the CLDT user to study the variable values in real time and confirm the IVR operation is proceeding as desired.

The next message is the Set Variable(s) Value(s) 615. This can set the value of an indicated variable, or set the values of an indicated set of variables in the IVR. This function is used when the CLDT instructs the IVR to go to a certain module, and sets the variables as indicated, so that the call processing can be tested with the value(s) indicated.

For example, the user may invoke a navigation control function to "back up" to the prior module in the menu structure. The IVR may not retain the state information at that point of entry into a prior menu module, and some of the variables may have been changed. For example, turning to FIG. 2, if the caller is currently at the Account Selection Message menu module 218, then the language flag has been set. If the user wants to back up to the Welcome Greeting menu module 205, the language flag would not have been set. Thus, the IVR cannot be simply forced to go back to the Welcome Greeting menu module 205 and start executing with the same variable value, because the language flag should not be set at this point in the menu structure. Because the CLDT knows the initial set of variable values when any menu module was first entered, it can command the IVR to set the variables to these values.

The Go To Module message 620 is sent by the CLDT to the IVR Menu Control module to force the call to a specific module. If a prior menu module is indicated, then the CLDT will retrieve the set of variable values previously received when the call entered that menu module and command the IVR Menu Control module to set the variables to these values. This allows the call to re-execute the module in a similar context as when it entered the module the first time. In some embodiments, the Go To Module message is limited to only "going back" to a previously entered menu module, since those variable values are known. If used to "jump ahead," then the determination of the appropriate variable values to use in the menu module may be more complicated. There may not be a set of variable values associated with that menu module, if it has not been previously entered. In such cases, some embodiments may not allow advancing to a menu module that has not been entered previously, whereas other embodiments will allow this, but may then require the user to define the variable values in some way.

Finally, the Start message 625 commands the IVR Menu Control module to begin execution of the steps or actions in the current menu module. This command may be used after the CLDT has commanded the IVR to go to a particular menu module and has set the value of variables for that point in the menu structure. Once accomplished, the Start message 625 tells the IVR to process the call at that indicated point.

These messages allow the CLDT to control the execution of the IVR, shadow the values of the variables, allow the user to view the variables and path taken in the IVR menu structure, view the current module where the call is being processed, and force the call back to a particular menu module and re-execute the call from that point. Thus, the CLDT user can effectively monitor and debug the processing logic of the IVR for a test call. Other messages may be defined to provide additional capabilities, or a greater granularity of control to accomplish the indicated functions.

Although the above description is illustrated using a separate IVR Menu Control module and a CLDT, in other embodiments, these modules may be integrated. If so, there is no need for an API between separate modules, nor for the messages as defined. However, the functions described above are still required to be implemented in some manner in the IVR application. Those skilled in the art will recognize that a variety of software architectures and approaches can be used to accomplish the functions described above.

Exemplary Computer Processing Device

As discussed earlier, there may be a number of distinct computer-based processing devices in various embodiments of the present invention, which execute modules for various purposes. For example, there may be a CLDT application specific computer processing device for processing inputs, storing values, and acting on user inputs. In other embodiments, these processing devices and/or modules may be combined or distributed on various components. In some embodiments, the functionality of the modules performing the functions described herein may be integrated into other modules or components.

Figure 7:
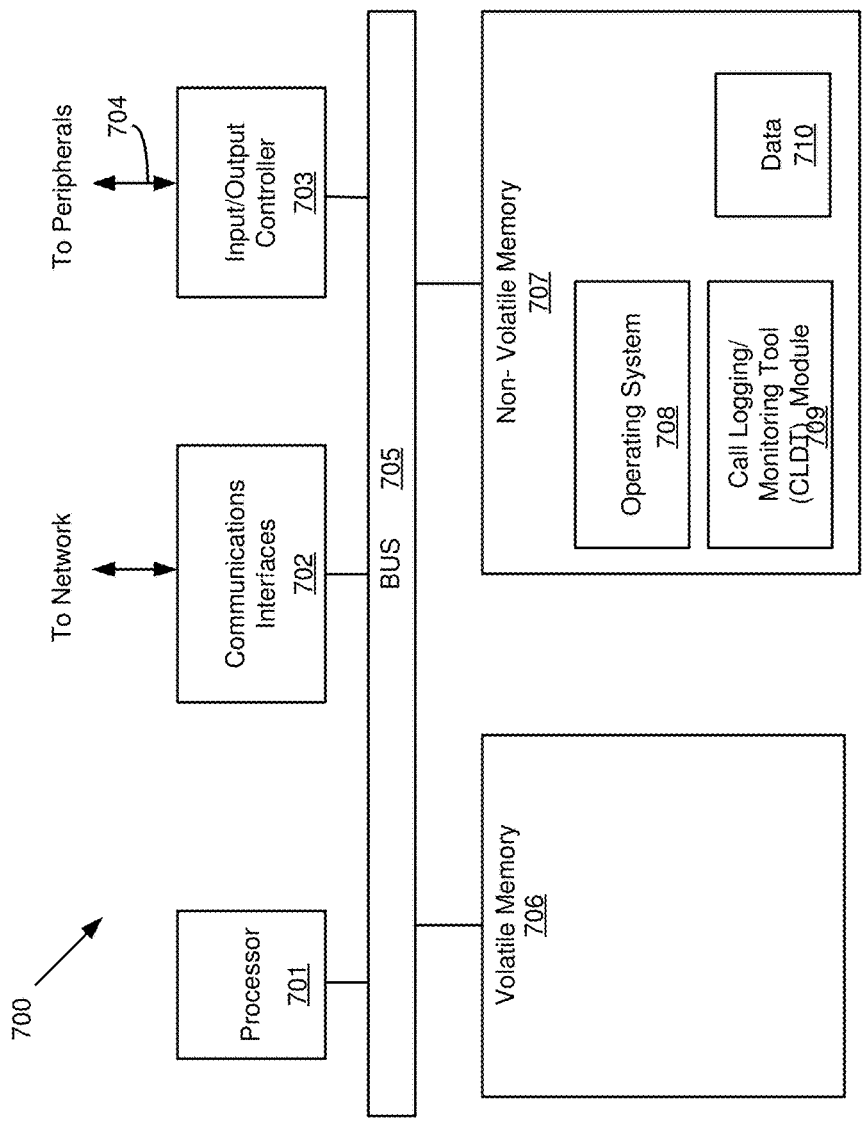
FIG. 7 illustrates one embodiment of a processing system used to implement the concepts and technologies disclosed herein.

FIG. 7 is an exemplary schematic diagram of a computer processing system that may be used in an embodiment for any one of the components disclosed above to practice the technologies or process flows disclosed herein. In general, the term "computer processing system" may be exemplified by, for example, but without limitation: a personal computer, server, desktop computer, tablets, smart phones, notebooks, laptops, distributed systems, servers, blades, gateways, switches, and the like, as well as any combination of devices or entities adapted to perform the functions described herein. Such a computer processing system executing the modules disclosed herein converts that computer processor into a specialized computer processing system.

As shown in FIG. 7, the processing system 700 may include one or more processors 701 that may communicate with other elements within the processing system 700 via a bus 705 or some other form of communication facility. The processor 701 may be implemented as one or more complex programmable logic devices ("CPLD"), microprocessors, multi-core processors, digital signal processors ("DSP"), system-on-a-chip ("SOC"), co-processing entities, application-specific integrated circuits ("ASIC"), field programmable gate arrays ("FPGA"), programmable logic arrays ("PLA"), hardware accelerators, Von Neumann based computer processing architecture, other circuitry, or the like.

In one embodiment, the processing system 700 may also include one or more communications interfaces 702 for communicating data via the local network, voice service provider, PSTN, or with various external devices, including the IVR 140. In various embodiments, the communication facility may be via wired, optical, or wireless networks (or a combination thereof). The communication may use a variety of data transmission protocols, such as fiber distributed data interface (FDDI), Ethernet, asynchronous transfer mode ("ATM"), or frame relay. The communications facilities may include any technology used to provide, e.g., ISDN interfaces. Although the interface may be an ISDN PRI interface, in other embodiments, a SIP or other VoIP interface could be used.

The input/output controller 703 may also communicate with one or more input devices or peripherals using an interface 704, such as, but not limited to: a keyboard, a mouse, a touch screen/display input, microphone, pointing device, etc. The input/output controller 703 may also communicate with output devices or peripherals, such as displays, printers, speakers, headsets, banner displays, other components in the contact center, etc. These may be used, in part, to receive data, such as contact lists or profile data retrieved from an external database.

The processor 701 may be configured to execute instructions stored in volatile memory 706, non-volatile memory 707, or other forms of computer readable storage media accessible to the processor 701. The volatile memory may comprise various types of memory technologies, including, but not limited to: random access memory ("RAM"), dynamic random access memory ("DRAM"), static random access memory ("SRAM"), and other forms well known to those skilled in the art. The non-volatile memory may comprise various technologies, including, but not limited to: storage media such as hard disks, floppy disks, read only memory ("ROM"), programmable read only memory ("PROM"), electrically erasable read only memory ("EPROM"), flash memory, and other forms well known to those skilled in the art.

The non-volatile memory 707 may store program code and data, which also may be loaded into the volatile memory 706 at execution time. Specifically, the non-volatile memory 707 may store the CLDT module 709 that may perform any of the above mentioned process flows, functions, or capabilities. Non-volatile memory may also store operating system code 708 containing instructions for performing the process and/or functions associated with the technologies disclosed herein. The CLDT module 709 may also access the various call answering outcome data 710 previously disclosed. The volatile memory 706 and/or non-volatile memory 707 may be used to store other information including, but not limited to: records, applications, programs, scripts, source code, object code, byte code, compiled code, interpreted code, machine code, executable instructions, cause codes, call logs, summary call attempt statistics, or the like. These may be executed or processed by, for example, processor 701. These may form a part of, or may interact with, the CLDT module 709. In some embodiments, the CLDT module 709 may be integrated in another component identified previously, such as the IVR 140 or computer 130. Thus, it is possible for the CLDT module 709 to be integrated into another piece of equipment, or distributed over other pieces of equipment.

The technologies described herein may be implemented in various ways, including as computer program products comprising memory storing instructions causing a processor to perform the operations associated with the above technologies. The computer program product comprises a non-transitory computer readable storage medium storing applications, programs, program modules, scripts, source code, program code, object code, byte code, compiled code, interpreted code, machine code, executable instructions, and/or the like (also referred to herein as executable instructions, instructions for execution, program code, and/or similar terms). Such non-transitory computer readable storage media include all the above identified computer readable media (including volatile and non-volatile media), but does not include a transitory, propagating signal, nor does it encompass a non-tangible computer readable medium. Non-volatile computer readable storage medium may specifically comprise: a floppy disk, flexible disk, hard disk, magnetic tape, compact disc read only memory ("CD-ROM"), compact disc compact disc-rewritable ("CD-RW"), digital versatile disc ("DVD"), Blu-ray™ disc ("BD"), any other non-transitory optical medium, and/or the like. Non-volatile computer readable storage medium may also comprise read-only memory ("ROM"), programmable read-only memory ("PROM"), erasable programmable read-only memory ("EPROM"), electrically erasable programmable read-only memory ("EEPROM"), flash memory, and/or other technologies known to those skilled in the art.

CONCLUSION

Many modifications and other embodiments of the concepts and technologies set forth herein will come to mind to one skilled in the art having the benefit of the teachings presented in the foregoing descriptions and the associated drawings. Therefore, it is to be understood that embodiments other than the embodiments disclosed herein are intended to be included within the scope of the appended claims. Although specific terms may be employed herein, except for the terms in the glossary, they are used in a generic and descriptive sense only and not for purposes of limitation.

The invention claimed is:

1. A system for debugging a call processed by an interactive voice response ("IVR") unit comprising a plurality of IVR menus, the IVR unit comprising a processor configured to:
   execute a first IVR menu after receiving the call initiated by a user, wherein the first IVR menu is one of the plurality of IVR menus, the first IVR menu comprising a first menu prompt provided to the user for a response;
   provide first information for display on a display screen of a computer of the user, the first information comprising a plurality of variable identifiers and a first corresponding set of first real-time values used in executing the first IVR menu;
   receive from the user a first audio response to the first menu prompt from the call;
   execute a second IVR menu in response to receiving the first audio response;
   provide second information for display on the display screen of the computer comprising the plurality of variable identifiers and a second corresponding set of second real-time values used in executing the second IVR menu;
   receive from the computer a first non-audio input from the user indicating a selected navigation control function from among a plurality of navigation control functions displayed to the user on the display screen of the computer, wherein the selected navigation control function requests execution of the immediately prior executed IVR menu; and
   alter the processing of the call by the IVR unit based on the first non-audio input by re-executing the first IVR menu, wherein the first menu prompt is provided again to the user.

2. The system of claim 1, wherein the first information comprising the plurality of variable identifiers and the first corresponding set of first real-time values further identifies the first IVR menu to the user and the second information further identifies the second IVR menu to the user.

3. The system of claim 1, wherein the processor is further configured to:
   receive a second selected navigation control function thereby causing the processor to suspend execution of the first IVR menu prior to executing the second IVR menu.

4. The system of claim 3, wherein the processor is further configured to:
   receive a third selected navigation control function after receiving the second selected navigation control function causing the processor to resume execution of the first IVR menu.

5. The system of claim 1, wherein the processor is further configured to provide the second information for display on the display screen of the computer by:
   transmitting the plurality of variable identifiers and the second corresponding set of second real-time values over an application programming interface to the computer.

6. The system of claim 1, wherein the processor is further configured to:
   receive a message from the computer in response to the user selecting a particular navigation control function requesting that the call be processed by executing a specified IVR menu.

7. A non-transitory computer readable medium storing instructions for debugging a telephone call that when executed by a processor in an interactive voice response ("IVR") unit cause the processor to:
   receive the telephone call at an interface to the IVR unit, wherein the telephone call is initiated by a user;
   execute a first IVR menu configured to provide a first recorded announcement to the telephone call over the interface prompting the user to enter a first audio response;
   provide first information for presentation to the user on a display screen of a computer interfaced with the IVR unit, the first information comprising a plurality of variable identifiers and a first set of corresponding real-time values used by the IVR unit in executing the first IVR menu along with a plurality of navigation control functions to select an IVR menu to execute;
   receive the first audio response on the telephone call over the interface from the user;
   execute a second IVR menu in response to receiving the first audio response, wherein the second IVR menu is configured to provide a second recorded announcement prompting the user to enter a second audio response, wherein the second recorded announcement does not provide an option to the user causing the IVR unit to re-execute the first IVR menu;
   provide second information for presentation to the user on the display screen of the computer interfaced with the IVR unit, the second information comprising the plurality of variable identifiers and a second set of corresponding real-time values used in executing the second IVR menu along with the plurality of navigation control functions;
   receive from the computer a first non-audio input from the user indicating a selected navigation control function from among the plurality of navigation control functions, wherein the selected navigation control function requests an immediately prior executed IVR menu to be re-executed; and
   alter the processing of the call by the IVR unit based on the first non-audio input by terminating execution of the second IVR menu and causing the first IVR menu to be re-executed, whereby the first recorded announcement is provided again over the interface to the user, and the plurality of variable identifiers and the first set of corresponding real-time are displayed on the screen of the computer.

8. The non-transitory computer readable medium of claim 7, wherein the instructions further cause the processor to:

suspend execution of the second IVR menu in response to receiving a second selected navigation control function prior to receiving the selected navigation control function.

9. The non-transitory computer readable medium of claim 8, wherein the instructions further cause the processor to:

resume execution of the second IVR menu in response to receiving a third selected navigation control function received prior to the selected navigation control function and after the second selected navigation control function.

10. The non-transitory computer readable medium of claim 8, wherein the instructions further cause the processor to:

modify one of the plurality of variable identifiers by replacing the corresponding real-time value from the first set of corresponding real-time values with a second corresponding real-time value after the first IVR menu is re-executed; and provide third information for presentation to the user on the display screen of the computer interfaced with the IVR, the information comprising a third set of the corresponding real-time values after the first IVR menu is re-executed.

11. The non-transitory computer readable medium of claim 8, wherein the instructions further cause the processor to:

receive a message from the computer identifying one of the plurality of variable identifiers and a modification to the first set of corresponding real-time values; and modify the first set of corresponding real-time values thereby producing a modified first set of corresponding real-time values; and display the modified first set of corresponding real-time values on the computer.

12. A method for debugging a call being processed by an interactive voice response ("IVR") unit comprising a plurality of IVR menus comprising:

receiving the call at the IVR unit initiated by a user;

receiving audio input at the IVR unit on the call from the user;

processing the call by a current IVR menu in response to receiving the audio input, wherein the current IVR menu is one of the plurality of IVR menus;

displaying on a display screen of a computer used by the user a graphical IVR menu structure comprising graphical representations representing at least two or more of the plurality of IVR menus, wherein a visual indication comprising one of the graphical representations on the graphical IVR menu structure indicates the current IVR menu module processing the call;

displaying a set of selected variable identifiers and a first set of associated values in real-time associated with the current IVR menu on the display screen of the computer, wherein the set of selected variable identifiers is used by the current IVR menu in processing the call;

displaying a plurality of IVR menu navigation icons on the display screen;

receiving non-audio input at the computer from the user selecting one of the plurality of IVR menu navigation icons comprising a request to execute an immediately prior executed IVR menu;

altering the processing of the call based on the non-audio input to execute the immediately prior executed IVR menu; and displaying the set of selected variable identifiers and a second set of associated values in real-time associated with the immediately prior executed IVR menu.

13. The method of claim 12, wherein the one of the plurality of IVR menu navigation icons is associated with a pause function that when invoked interrupts execution of actions associated with a presently executing IVR menu.

14. The method of claim 13, wherein the one of the plurality of IVR menu navigation icons is associated with a resume function that when invoked resumes execution of actions associated with the presently executing IVR menu.

15. The method of claim 12, wherein the one of the plurality of IVR menu navigation icons is associated with a modify function that when invoked modifies execution of a presently executing IVR menu to another IVR menu.

16. The method of claim 15, further comprising:

processing the call by the another IVR menu using the set of selected variables and associated values used in a prior processing of the call by the current IVR menu.

17. The method of claim 12, further comprising the step of:

displaying on the display screen a history of executed actions associated with the current IVR menu.

* * * * *